United States Patent [19]

Vogts

[11] 3,932,106
[45] Jan. 13, 1976

[54] INJECTION MOLDING HEAD FOR FORMING HONEYCOMBED THERMOPLASTIC STRUCTURES

[75] Inventor: Arnold Vogts, Krahenwinkel, Germany

[73] Assignee: Kabel-und Metallwerke Gutehoffnungshuette Aktiengesellschaft, Germany

[22] Filed: July 11, 1974

[21] Appl. No.: 487,537

[30] Foreign Application Priority Data
July 17, 1973 Germany............................ 2336313

[52] U.S. Cl. ................ 425/505; 425/515; 425/381; 425/382 N; 425/464
[51] Int. Cl.² ........................................ B29C 23/00
[58] Field of Search............. 425/133.1, 381, 382 N, 425/464, 465, 505, 516; 264/174, 177, 209; 156/500, 244

[56] References Cited
UNITED STATES PATENTS

| | | | |
|---|---|---|---|
| 2,452,607 | 11/1948 | Slaughter............................ | 156/244 |
| 3,019,147 | 1/1962 | Nalle, Jr. ......................... | 425/382 N |
| 3,368,241 | 2/1968 | Williams............................. | 425/465 |
| 3,551,543 | 12/1970 | Mercer et al. .................. | 264/177 R |
| 3,555,128 | 1/1971 | Schrenk........................... | 425/131.1 |
| 3,557,271 | 1/1971 | Fairbanks ....................... | 425/382 N |
| 3,683,059 | 8/1972 | Fairbanks ..................... | 264/DIG. 81 |
| 3,767,353 | 10/1973 | Gaffney ............................. | 425/464 |

Primary Examiner—Francis S. Husar
Assistant Examiner—Carl Rowold
Attorney, Agent, or Firm—Marn & Jangarathis

[57] ABSTRACT

In accordance with the teachings of the instant invention, there is disclosed an injection molding head for forming honeycombed structures of thermoplastic materials, which comprises a fixed mouthpiece having a plurality of strand channels extending longitudinally therethrough; a plurality of guide channels extending longitudinally therethrough and interposed between said strand channels; a strand deviation guide mechanism comprising a plurality of elongated members each slidably mounted in one of said guide channels; a frame arrangement attached to one end of each of a group of the elongated members for moving in a longitudinal direction one end of each of the elongated members beyond the exit end of the fixed mouthpiece for the provision of high thrust, lateral forces proximate to the output of said strand channels, and withdrawing the ends of the said elongated members from said extended position to within said fixed mouthpiece; and a drive apparatus coupled to the frame arrangement for moving the frame arrangement toward and away from the fixed mouthpiece in an oscillatory manner. The elongated members may be configurated as organ-type pipes for directing high pressure jets obliquely and rearward toward the output end of the fixed mouthpiece, as such pipes are extended beyond the exit end of the fixed mouthpiece. Alternatively, the elongated members comprise bundles of elongated spring lamellas which spread laterally when they are extended beyond the output end of the fixed mouthpiece. In either case, longitudinally moving strands of thermoplastic material that are emitted from the strand channels are momentarily deviated in a lateral direction by the high pressure jets or spreading spring lamellas, to achieve precisely controlled welding contact between adjacent strands.

6 Claims, 6 Drawing Figures

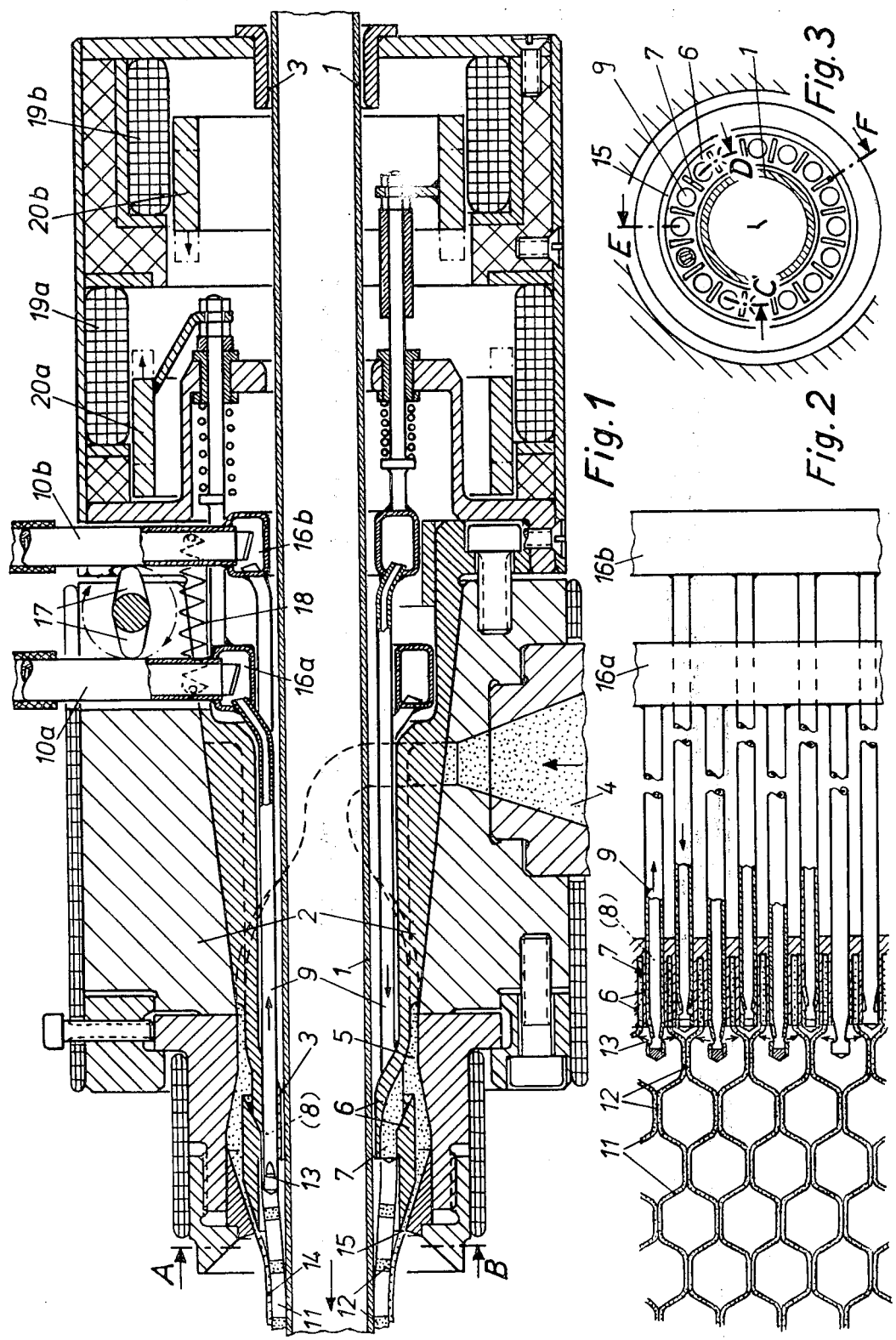

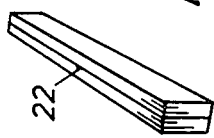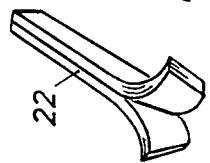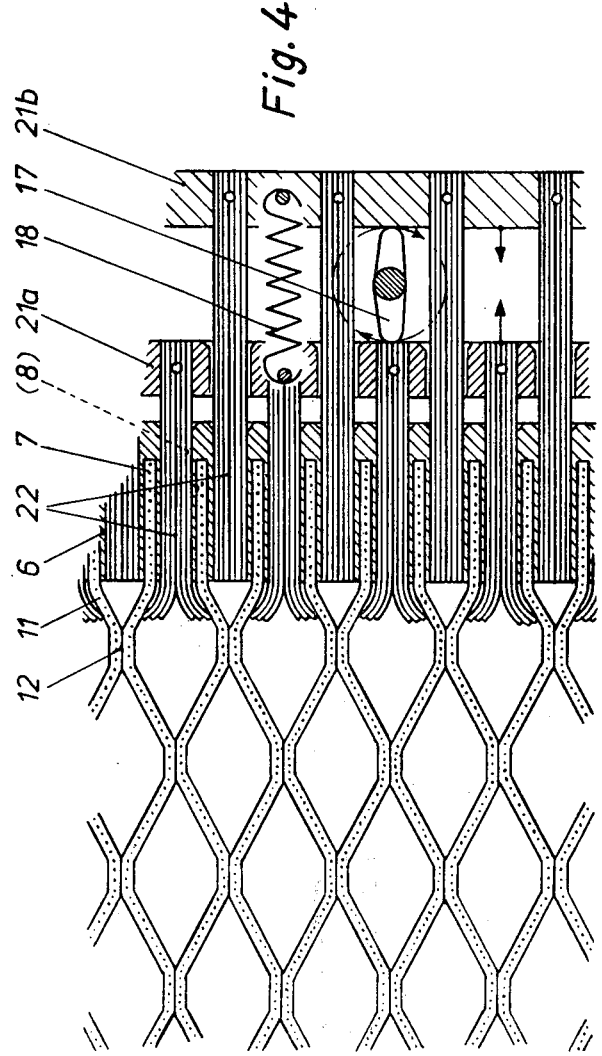

INJECTION MOLDING HEAD FOR FORMING HONEYCOMBED THERMOPLASTIC STRUCTURES

BACKGROUND AND THE INVENTION

This invention relates to apparatus for manufacturing honeycombed thermoplastic structures and, more particularly, to such apparatus comprising laterally moving oscillating groups of the elongated members that alternatively extend beyond the exit end of a fixed mouthpiece of an injection molding head to provide periodic lateral deviation of longitudinally moving strands of thermoplastic material so that they periodically engage each other to achieve a selective welding therebetween to form a honeycombed structure.

A conventional injection molding head for making thermoplastic honeycombed structures used as an insulating component of an electrical cable is disclosed in German Patent 1,099,680. With such a conventional injection molding head, longitudinally moving thermoplastic material exits from the head in strands from the exit ends of a multiplicity of nozzles in the head, and the injection direction of the strands are continuously changed by admitting oscillatory rotary movements to the individual nozzles, thus causing the various strands of thermoplastic material exiting the head to come into periodic contact with each other immediately beyond the exit end of the injection molding head.

Another priorly known injection molding head for making honeycombed thermoplastic structures is described in German DOS 1,779,330. As therein depicted, the injection molding head is provided with a fixed mouthpiece having a plurality of strand forming nozzle channels between which separate guide channels are provided for the passage of gas under pressure for periodically alternating the lateral movement of the strands exiting the strand forming nozzle channels, such guide channels being substantially parallel to the nozzle channels.

It is a principal object of the instant invention to provide an improved injection molding head of the immediately aforementioned type with the capability of controlling, with a high degree of exactness, the lateral deviation of the longitudinally moving strands of thermoplastic material. Preferably an extended after pressure is provided, avoidance of weld density problems is achieved, and high strength welds are realized.

In accordance with the teachings of the instant invention, an improved injection molding apparatus is set forth wherein such apparatus comprises an injection molding head having a fixed mouthpiece positioned at the exit end thereof. Such mouthpiece includes a plurality of strand channels extending longitudinally therethrough and a plurality of guide channels also extending longitudinally therethrough and interposed between various ones of the plurality of strand channels. Longitudinally extending through the plurality of guide channels are a plurality of elongated members alternately separated into a first and second group of such members. The first group of such elongated members are attached at one of each of their respective ends to a first distribution frame mechanism which serially connects each of such elongated members of the first group to each other. In a similar fashion, the second group of such elongated members are attached at one of each of their respective ends to a second distribution frame mechanism which serially connects each of such elongated members of the second group to each other. A drive mechanism is coupled to the first and second distribution frame mechanisms for providing reciprocating displacement of such mechanisms longitudinally toward and away from each other so as to alternately extend the unattached opposite ends of the first and second groups of elongated members beyond the exit end of the fixed mouthpiece so that lateral oscillatory forces are applied to the freshly extruded thermoplastic strands formed at the exit end of the plurality of strand channels to provide a large periodic lateral deviation in the direction of adjacent strands so as to achieve an improved weld as the adjacent longitudinally moving strands are periodically deviated in their path of movement so as to come into contact with each other, resulting in longitudinally spaced welds.

In accordance with a first embodiment of the invention, the elongated members comprise a plurality of organ pipes, each slidably mounted in one of the plurality of guide channels for permitting a lateral high pressure discharge of gas or liquid to deviate the longitudinal movement of the immediately adjacent thermoplastic strands as they exit the strand channels of the fixed mouthpiece. The sequential movement of the unattached ends of the first and then the second group of organ pipes beyond the exit end of the fixed mouthpiece provides strictly controlled exit openings for a high pressure gas or liquid material in the organ pipes to escape therefrom in a lateral direction with respect to theh longitudinally moving, freshly extruded plastic strands. The oscillatory opening and closing of the exit openings of the organ pipes of each of the two groups results in high lateral forces being periodically applied to the extruded plastic strands in view of the dynamic effect of the resulting intermittent jet effect, especially in the case where warm air pressure is used as the strand deviating material in the organ pipes. Additionally, when the ends of the organ pipes extending beyond the exit end of the fixed mouthpiece are moved in a direction away from the exit end, a venturi nozzle effect is obtained, that is, an additional suction effect is realized on the sides of the strands being welded.

In a second embodiment of the instant invention, the elongated members extending through the guide channels of the injection molding head are comprised in a plurality of bundles of pretensioned spring lamellas, each having an end thereof which is extendable beyond the exit end of the fixed mouthpiece. Upon the ends of one of the groups of such bundles of lamellas being extended beyond the exit end of the fixed mouthpiece, the guide channel through which they pass no longer restrict lateral spreading and, accordingly, the extending portions of such bundles spread apart in a high thrust manner to engage in a lateral direction the thermoplastic strips exiting the immediately adjacent strip channels in a highly controlled and precise manner. The utilization of pretensioned bundles of spring lamellas permits a highly precise configuration with highly viscous plastic materials on a consistent basis. The outer spring lamellas of each bundle may consist of a layer of anti-bonding material, for instance, polytetrafluorethylene or be covered by such a material. The bunching of a plurality of thin spring lamellas into a package to define each of the elongated member is advantageous because the spring width of the released spring lamellas is rather large while the bending tension spring remains small.

The invention will be more clearly understood by reference to the following detailed description of exemplary embodiments thereof, in conjunction with the accompanying drawings in which:

FIG. 1 is a longitudinal sectional view of an exemplary embodiment of the instant invention for injection molding of a honeycombed structure of thermoplastic material about a metal or plastic pipe;

FIG. 2 is a schematic view illustrating the intercooperation of various elements of the embodiment depicted in FIG. 1 to achieve precisely controlled formation of the honeycombed structure in accordance with the instant invention;

FIG. 3 is a partial cross-sectional side view taken along the line A—B of FIG. 1;

FIG. 4 is a schematic view illustrating alternative elongated members comprising bundles of spring lamellas for controlled deviation of the longitudinal movement of the thermoplastic strips as they exit into the atmosphere;

FIG. 5 is a schematic view illustrating one of the bundles of spring lamellas depicted in FIG. 4 in a compressed condition when its left end is withdrawn from the atmosphere into the fixed mouthpiece of the injection molding head; and FIG. 6 is a schematic view of the spring lamellas of FIG. 5 in an expanded condition when the left end thereof is extended beyond the fixed mouthpiece into the atmosphere.

Referring now to the drawings and more particularly to FIG. 1, an injection molding head 1 comprises a longitudinal bore 3 through which a metal or plastic pipe 2 may be axially moved in a conventional manner by drive mechanisms (not shown) through the head 1 in the direction of the arrow. Within the injection molding head 1 there is provided a conventional charge opening 4 for the provision of plasticized theremoplastic material that is moved by a conventional worm thread screw (not shown) to an annular space 5. In communication with such annular space 5 there is provided a fixed mouthpiece 6 having a plurality of nozzle openings 7 from which the thermoplastic material continuously exits into the atmosphere in strand form. The fixed mouthpiece 6 further comprises a plurality of guide channels 8 which are alternately interposed between the nozzle openings 7. As illustrated in FIG. 2, there are provided a plurality of organ pipes 9 divided into two groups, the first of which are attached at one of each of their respective ends to a distribution frame 16a, and a second group are attached at one of each of their respective ends to a distribution frame 16b. The organ pipes 9 are so attached to the distribution frames 16a and 16b that their axial alignment permits their opposite unattached ends to be slidably positioned within the plurality of guide channels 8 of the fixed mouthpiece 6 in such an arrangement that immediately adjacent guide channels 8 alternatively include an organ pipe 9 attached to distribution frame 16a and an organ pipe 9 attached to the distribution frame 16b. The distribution frames 16a and 16b are configured so as to provide an airtight chamber which communicates with each of the organ pipes 9 attached thereto. The organ pipes 9 attached to distribution frame 16a are in series with each other for the transmission of air pressure in the direction of the exit end of the injection molding head 1, as for the organ pipes 9 attached to the distribution frame 16b. The distribution frames 16a and 16b are in communication, respectively, with connecting pipes 10a and 10b which are in turn coupled to a conventional pressure generator or air pressure compressor (not shown).

Longitudinal countermotion of the distribution frames 16a and 16b is provided by a cam drive 17 positioned between the distribution frames 16a and 16b so as to force them apart against a tension force provided by a spring 18 connected between distribution frames 16a and 16b. The cam drive 17 provides a simple solution to adjust various control programs of the longitudinal movements of the two groups of organ pipes 9 by merely changing the shape of the cam which may be driven by an electrical motor (not shown).

As depicted in FIG. 2, the organ pipes 9 are in the position assumed when the distribution frames 16a and 16b are forced apart, the organ pipes 9 attached to the distribution frame 16a exiting through the guide channels 8 of the fixed mouthpiece 6. Each of the organ pipes 9 at their ends positioned within or extending beyond the exit end of the fixed mouthpiece 6 are axially closed but include two opposite slots 13 in thier sidewalls for directing jets of air pressure obliquely and somewhat rearward with respect to the direction of the injection molding. As the organ pipes 9 exit the mouthpiece 6, high pressure jets of air are released through the organ slots 13 since they are no longer blocked by the internal surfaces defining the guide channels 8 of the fixed mouthpiece 6. As the jets of air pressure emitting from the organ slots 13 engage the strands 11 in an oblique direction, such strands 11 are deviated laterally from their normal longitudinal direction of movement to engage each other and to form therebetween periodic weld contacts 12. As the distribution frame 16a is moved in the direction toward the fixed mouthpiece 6, the distribution frame 16b is moved in the opposite direction carrying with it the group of organ pipes 9 attached thereto. Thus, the unattached ends of these organ pipes 9 are retracted by the distribution frame 16b to a position with the plurality of guide channels 8 through which they extend. Accordingly, the plurality of organ slots 13 located within the side portions of the last mentioned organ pipes 9 are blocked by the internal surfaces of the fixed mouthpiece 6 defining the guide channels 8 through which they extend, thus completely closing off any air pressure jets that would be realized if organ pipes 9 extended beyond the fixed mouthpiece into the atmosphere. A further turning in a clockwise direction of the cam drive 17 beyond the state illustrated in FIG. 1 permits the distribution frames 16a and 16b to move toward each other because of the forces applied thereto by the spring 18 connected between distribution frames 16a 16b. Upon the distribution frames 16a and 16b moving toward each other, the axial positions of the organ pipes 9 are changed so that the group of such organ pipes 9 connected to distribution frame 16b extend beyond the exit end of the fixed mouthpiece 6, while the organ pipes 9 attached to the distribution frame assembly 16a are axially moved in a direction to withdrawn the unattached opposing ends of such organ pipes 9 from a position beyond the exit point of the fixed mouthpiece 6 into the guide channels 8 through which they extend so as to block the organ slots 13 of such organ pipes 9. It will be evident that the continuous rotation of the cam drive 17 in the clockwise direction indicated by the arrows depicted in FIG. 1 will cause the connecting frames 16a and 16b to continuously slide in an oscillatory manner away and toward each other which will result in extending the unattached ends of the organ pipes 9 of the first group of such pipes beyond the exit point of the fixed mouthpiece 6, while withdrawing the unattached ends of the second group of organ pipes 9 from beyond the exit point of the fixed mouthpiece 6 into the guide channels 8 through which they pass, and continuing such extension and withdrawal of the ends of the two groups of organ pipes 9 in an oscillatory manner so as to achieve hard thrusts of jets of air in a lateral direction from the first group of organ pipes 9 and then from the second group of organ pipes 9 and continuing thereafter in a cyclic manner.

As illustrated in FIG. 2, at the moment that the group of organ pipes 9 which are attached to the distribution frame 16a exit from the guide channels 8 of the fixed mouthpiece 6, jets of air pressure are released in a lateral or oblique direction through the organ pipe slots 13, and such jets of pressure cause the adjacent thermoplastic strips 11 in their path to deviate from their longitudinal direction of movement into engagement with each other to achieve welds at the contact points 12.

In the embodiment depicted in FIG. 1, the organ slots 13 are guided in very close proximity to the freshly extruded adjacent strands 11, thus enabling a maximum lateral deviation to be achieved by the high pressure jets, which preferably comprise warm air to assist in the welding process. Further, the withdrawal of one of the groups of organ pipes 9 while the other group is being extended, provides a Venturi-nozzle effect that provides a suction force on the sides of the strands 11 opposite to which the jets of air are applying lateral deviation forces. As will be readily apparent, the operation of the deviation of the strands 11 in this embodiment is purely dynamic, that is, the sudden release of the jets of air with high thrust and the aforesaid suction effect, determines the strand guidance and the pressure force.

The shape of the organ slots 13 is important. As indicated in FIG. 2, opposite organ slot 13 are provided in each of the organ pipes 9. With this arrangement the jets of air are directed obliquely rearward toward nozzle channels 7 when the pipes extend beyond the exit point of the fixed mouthpiece 6. Advantageously, two opposite lateral bores are utilized to form the organ slots 13. Further, electric valve switches (not shown) may be provided in each of the organ pipes 9 to provide additional control of the jet release mechanism. In those situations wherein an extended welding effect is desired, the lateral movement of the organ pipes 9 are synchronized with the longitudinal lateral speed of movement of the metal or plastic pipe 2 so as to achieve an extended engagement of the air pressure jets from the organ slots 13 when the thermoplastic strips 11 to maximize the length of weld contacts 12. Further, the speed of the axial movement of the metal or plastic pipe 2 through the bore 3 of the injection molding head 1, as well as the force and sequence of the periodic jets applied to the adjacent strips 11 as they exit from the nozzle openings 7, may be varied so that the rigidity and shape of the honeycombed structure may be varied prior to its solidifying. Further, if desired an outer jacket or casing 14 may be provided of a like of different plastic material by the injection molding head 1 of FIG. 1 by means of a jacket nozzle 15 which is obliquely directed to the external ends of the nozzle openings 7. The jacket and honeycombed material may be of thermoplastic material which weld together upon contact. In order to provide water tightness in the jacket 14 it is advantageous to coat the metal or plastic pipe 2 before its entrance into the injection molding head 1 with a thin layer of copolymer. This copolymer layer provides an intimate bond between the pipe 2 and the honeycombed structure with respect to the latter's internal surface.

As an alternative means for driving the distribution frames 16a is an electromagnetic drive arrangement as shown in the right hand portion of FIG. 1. This arrangement comprises anchor rings 20a and 20b of magnitizable material mounted on the distribution frames 16a 16b. The distribution frames 16a and 16b are retracted and ejected by means of an engaging spring supports 21a and 21b as determined by the current flow through a pair of electromagnetic coils 19a and 19b. When this alternative drive arrangement is utilized, the aforesaid cam drive 17 and spring 18 are eliminated.

Referring to FIGS. 4, 5 and 6, there is depicted a mechanical alternative to the strand deviating arrangement previously described as comprising groups of reciprocating organ pipes 9 from which high pressure jets of air are emitted. As schematically represented in FIG. 4, there is provided two groups of bundles of elongated spring lamellas 22, the first group being attached at one of each of their respective ends to a distribution frame 21a, and a second group of bundles of elongated spring lamellas 22 attached at one of each of their respective ends to a distribution frame 21b. The axial movement of the distribution frames 21a and 21b is similar to that described frames 16a and 16b depicted in FIG. 1. As schematically represented by FIG. 4, when the distribution frames 21a and 21b are spread apart a maximum distance as determined by the cam drive 17 configuration, the unattached ends of the bundles of elongated spring lamellas 22 associated with distribution frame 21a extend through and beyond the exit point of guide channels 8 of the fixed mouthpiece 6, thus permitting the portions of such bundles of elongated lamellas 22 that extend beyond the exit point to spread laterally and engage, in a thrust manner, the immediately adjacent longitudinally moving, thermoplastic strands 11 exiting from the nozzle openings 7 of the fixed mouthpiece 6. Consequently, the various thermoplastic strands 11 are momentarily laterally deviated from their longitudinal direction of movement and engage each other to achieve welding contacts 12 between adjacent strands.

As depicted in FIG. 4, the bundles of elongated spring lamellas 22 which are driven by the distribution frame 21b are in their retracted positions and are restrained from spreading in a lateral direction by those surfaces of the fixed mouthpiece 6 that define the guide channels 8 in which such bundles are positioned. FIG. 5 depicts the condition of a bundle of elongated spring lamellas 22 when the end thereof remote from the distribution frame is positioned within or withdrawn into a guide channel 8, while FIG. 6 depicts the condition of such bundle of elongated spring lamellas when such end is extended beyond the exit point of the fixed mouthpiece 6 as the distribution frame to which it is connected is moved toward the mouthpiece. The outer springs of each bundle of spring lamellas 22 may preferably be covered with a material which does not adhere with the thermoplastic material of the strands 11, in order to avoid sticking and friction when such outer springs engage the strands exiting from the nozzle openings 7 of the fixed mouthpiece 6.

The injection molding head 1 described with regard to FIG. 1, as well as the alternative strand deviating mechanism for such head described with regard to FIGS. 4, 5, and 6, may in accordance with the instant invention be utilized to make exactly dimensioned honeycombed structures even in the absence of the internal metal or plastic pipe 2. In the absence of forming such a honeycombed structure about a pipe, the structure initially has a tubular configuration but may be opened into a continuous strip by the provision of a cutting knife at a point beyond the exit point of the injection molding head. The welding factor achieved by the utilization of the equipment herein described is almost unity, that is, the welding bond at the contact point 12 is as strong as the base material. The honeycombed structures made in accordance with the instant invention, are especially suitable for heat as well as electrical insulation, but of course may be utilized for other purposes with respect to which he insulating qualities or structural configuration are of advantage.

While the invention has been described in conjunction with exemplary embodiments thereof, it will be understood that many modifications will be readily apparent to those of ordinary skill in the art; and that this application is intended to cover any adaptations or variations thereof. Therefore, it is manifestly intended that this invention be limited only by the claims and the equivalents thereof.

I claim:

1. Injection molding head for forming honeycombed structures of thermoplastic materials, comprising:
a fixed mouthpiece having a plurality of apertures extending longitudinally therethrough for providing extrusion orifices each having a permanent cross-sectional configuration in an output surface of said mouthpiece, and a plurality of guide channels extending longitudinally therethrough and interposed between but spacially separated from said apertures;
strand deviation guide means including:
a plurality of elongated members each slidably mounted in one of said guide channels;
a frame means attached to one end of each of a group of said elongated members for moving in a longitudinal direction one end of each of said elongated members beyond the exit end of said fixed mouthpiece for the provision of high thrust, lateral forces only beyond said output surface but proximate to the output of said extrusion orifices, and withdrawing said ends of the said elongated members from said extended position to within said fixed mouthpiece; and
drive means coupled to said frame means for moving said frame means toward and away from said fixed mouthpiece in an oscillatory manner.

2. An injection molding head in accordance with claim 1, wherein said plurality of elongated members form a first and a second group of such members, said frame means including a first distribution frame and a second distribution frame attached, respectively, to said first and second groups of elongated members, and said drive means being coupled to said first and second distribution frames in a manner to move one of said frames toward said fixed mouthpiece while moving the other of said frames away from said mouthpiece, in an oscillatory countermovement manner.

3. An injection molding head in accordance with claim 2, wherein said elongated members comprise bundles of elongated spring lamellas slideably mounted in said guide channels and extendable beyond the output end of said fixed mouthpiece, whereat the lamellas spread apart in front of the output ends of the immediately adjacent strand channels of said mouthpiece.

4. Injection molding head for forming honeycombed structures of thermoplastic materials, comprising:
a fixed mouthpiece having a plurality of strand channels extending longitudinally therethrough, and a plurality of guide channels extending longitudinally therethrough and interposed between said strand channels;
strand deviation guide means including:
a first and a second group of organ-type pipes each slidably mounted in one of said guide channels;
a frame means including a first distribution frame and a second distribution frame attached, respectively, to one end of each of said first and second groups of pipes so as to provide air tight chambers serially connected thereto, and for moving in a longitudinal direction one end of each of said pipes beyond the exit end of said fixed mouthpiece for the provision of high thrust, lateral forces proximate to the output of said strand channels, and withdrawing said ends of said pipes from said extended position to within said fixed mouthpiece; and
drive means coupled to said first and second distribution frames to move one of said frames toward said fixed mouthpiece while moving the other of said frames away from said mouthpiece, in an oscillatory, countermovement manner.

5. An injection molding head in accordance with claim 4, wherein said organ-type pipes are axially closed at their ends within or extending beyond the exit end of said fixed mouthpiece, but include organ slots in their side walls for directing high pressure jets obliquely and rearward toward the output end of said strand channels when said organ slots of said elongated members are positioned beyond the exit end of said fixed mouthpiece.

6. An injection molding head in accordance with claim 5, wherein said organ pipes comprise two opposite organ pipe slots having lateral bores in their side walls for directing high pressure jets obliquely rearward when said pipes are extended beyond the exit end of said fixed mouthpiece.

* * * * *